United States Patent [19]

Sato

[11] 4,120,007
[45] Oct. 10, 1978

[54] HEAD SWITCHING CONTROL APPARATUS FOR USE IN A VIDEO SIGNAL PROCESSING SYSTEM

[75] Inventor: Ichitaro Sato, Atsugi, Japan

[73] Assignee: Sony Corporation, Tokyo, Japan

[21] Appl. No.: 770,236

[22] Filed: Feb. 18, 1977

[30] Foreign Application Priority Data

Feb. 18, 1976 [JP] Japan .............................. 51-17104[U]

[51] Int. Cl.² ........................................... G11B 15/14
[52] U.S. Cl. ........................................ 360/64; 360/33
[58] Field of Search .................... 360/64, 33, 35, 73, 360/75, 70; 358/127, 148

[56] References Cited

U.S. PATENT DOCUMENTS

| 3,401,231 | 9/1968 | Baldwin | 360/64 |
|---|---|---|---|
| 3,580,992 | 5/1971 | Eguchi | 360/64 |
| 3,600,508 | 8/1971 | Dann | 360/73 |
| 3,838,451 | 9/1974 | Mino | 360/64 |
| 3,958,271 | 5/1976 | Sumiyoshi | 360/70 |

*Primary Examiner*—Bernard Konick
*Assistant Examiner*—Alan Faber
*Attorney, Agent, or Firm*—Lewis H. Eslinger; Alvin Sinderbrand

[57] ABSTRACT

Head switching control apparatus for use in video signal processing apparatus of the type comprised of plural rotary transducer heads which scan successive tracks across a recording medium, each track having recorded therein a composite video signal. The head switching control apparatus functions to selectively connect individual transducer heads, one at a time, to video signal receiving circuitry. This head switching control apparatus is comprised of a position pulse generator for generating position pulses representing the relative positions of the transducer heads with respect to the recording medium. A bi-state circuit is conditioned in first and second states in response to successive position pulses. Switching circuitry is coupled to the transducer heads to electrically connect individual ones of the heads to the video signal receiving circuitry. A synchronizing signal separator is coupled to the video signal receiving circuitry and separates the equalizing signals included in the vertical blanking interval from the video signal. A switch pulse generator is coupled to the synchronizing signal separator and to the bi-state circuit and is responsive to the first and second states of the bi-state circuit for generating switch pulses which are synchronized with the separated equalizing signals. Thus, head switching noise is constrained to coincide with the equalizing signal to avoid false snyc signals.

6 Claims, 11 Drawing Figures

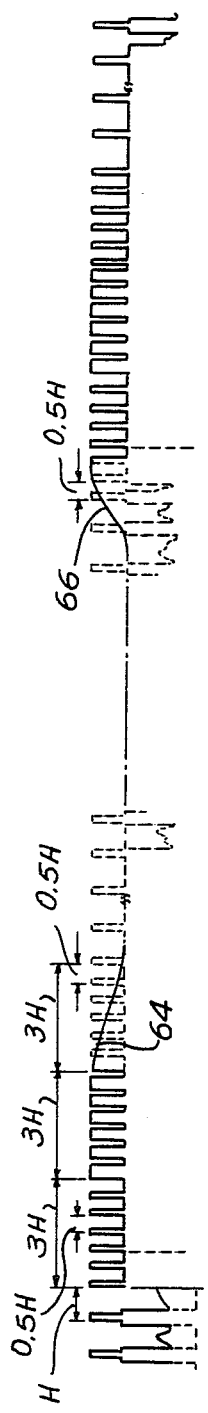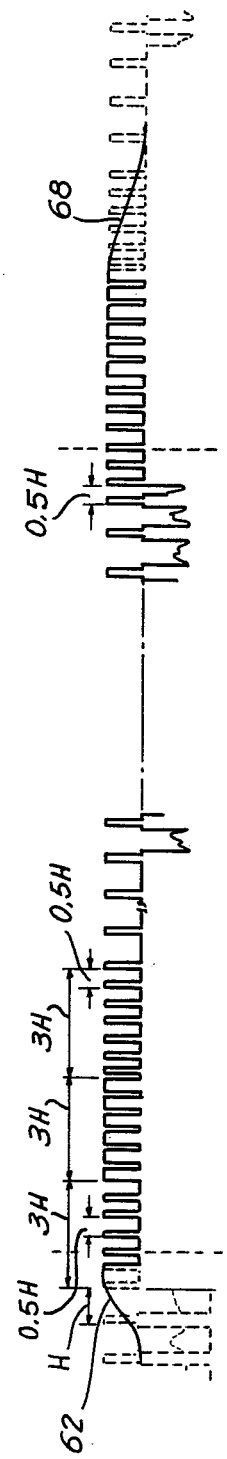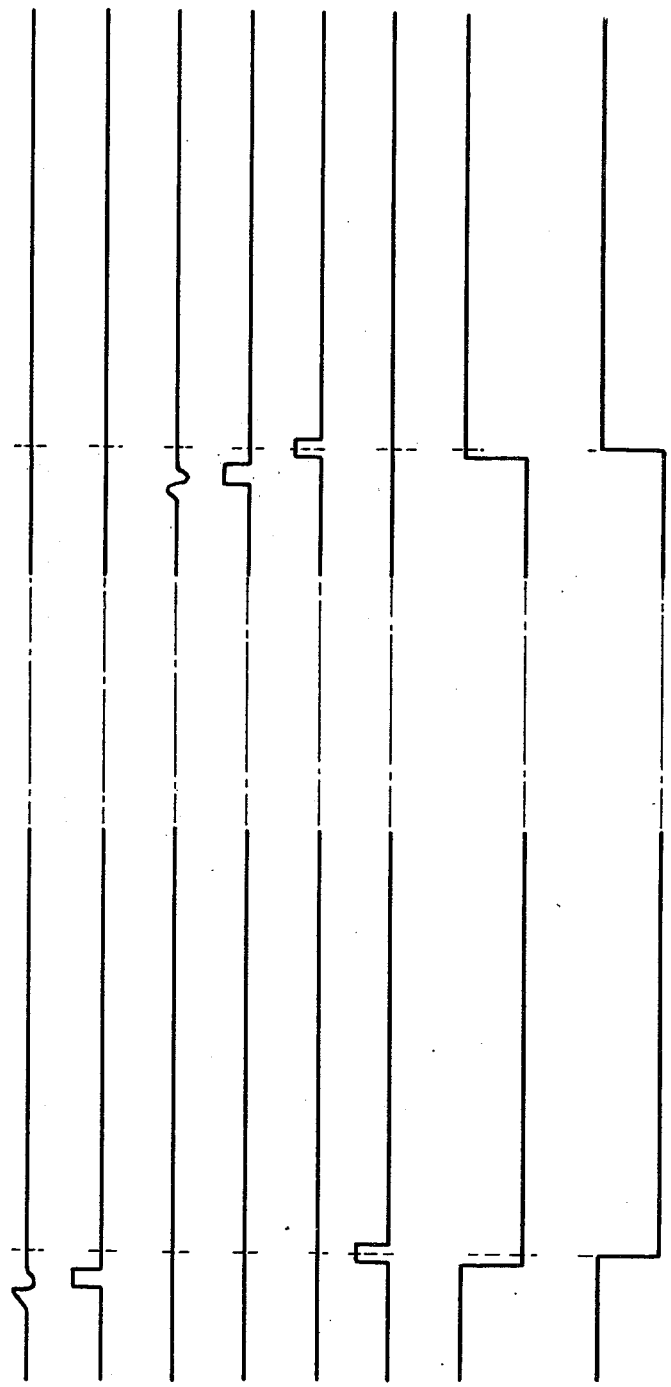

HEAD SWITCHING CONTROL APPARATUS FOR USE IN A VIDEO SIGNAL PROCESSING SYSTEM

BACKGROUND OF THE INVENTION

This invention relates to head switching control apparatus and, more particularly, to such apparatus which is used in video signal processing apparatus for selectively connecting individual rotary transducer heads, one at a time, to video signal receiving circuitry such that transient noise or pulses which may be produced when the heads are switched, or connected, are timed to occur at substantially the same time during successive video fields.

In a typical video signal recorder, such as a magnetic video signal recorder, two or more rotary magnetic heads scan a recording medium. In one type of recorder, this medium is magnetic tape and the recording system is the so-called video tape recorder (VTR). In a typical two-head VTR, each head scans an oblique track across the magnetic tape. During a recording operation, each track is provided with a video signal field derived from the usual interlaced video fields of, for example, a composite video signal which is about to or has been broadcasted. Thus, each field recorded in a respective track is comprised of video signal information, horizontal synchronizing pulses and the vertical blanking interval. In accordance with a conventional television signal, the vertical blanking interval is formed of a number of equalizing pulses followed by a number of vertical synchronizing pulses followed by another series of equalizing pulses and then a number of horizontal synchronizing pulses preceding the video signal information. In order to record the composite video signal properly in each track, the continuous signals supplied to the VTR must be divided between first one and then the other rotary head. That is, suitable switching apparatus is provided to supply the continuous signal to one head while it scans the magnetic tape, and then to the other head when such other head rotates into contact with the tape. Similarly, during a reproducing, or playback, operation, a switching operation between the two heads must be performed so as to recover a continuous video signal therefrom. That is, when one head scans a track, the previously recorded video signals which are reproduced thereby must be coupled to suitable video signal receiving circuitry; and when the other head rotates into contact with the tape, that head must be switched to the signal receiving circuitry.

One type of head switching control apparatus which has been proposed by the prior art exercises control over the head switching circuitry both during recording and during playback. This proposal recognizes that it is possible to generate a gap from the time one head is disconnected from the signal receiving circuitry until the time that the other head is connected thereto. That is, a gap in the desired continuous video signal may be produced during this head switching, or change-over, period. The prior art suggests that this gap can be avoided if one head reaches the end portion of a track concurrently with the other head reaching the beginning portion of its track, thereby exhibiting some "overlap" in the respective track scans. If this overlap is present during recording, the same information will be recorded by both heads in respective tracks during the overlapping period. Similarly, during signal reproduction, the signals reproduced by one head will be the same as the signals reproduced by the other head during this overlapping period. According to this prior art proposal, if both heads are connected simultaneously to the signal receiving circuitry during this overlapping period, there will be no gap in the continuous video signal which is reproduced. However, at the start of this overlapping period and at the conclusion thereof, switching circuitry is actuated to selectively connect and disconnect the respective transducer heads. Hence, two transient pulses, or noise, will be generated as a function of this head-connect and head-disconnect switching. Although the particular times of occurrences of such transient pulses may be predictable such that clamping or blanking signals can be produced so as to mute or compensate for such noise, there is the possibility that, because of tape shrinkage, small differences in mechanical tolerances among different VTR devices, and the like, the precise times of occurrence of the transient pulses may deviate from the expected times. Consequently, transient noise may be provided during a horizontal line interval in the reproduced continuous video signal, this transient noise appearing as streaks of light in the ultimately reproduced video picture.

In another prior art proposal, head switching control apparatus is used only during a reproducing operation and not during signal recording. Rather, during recording, the composite video signal is applied simultaneously to both rotary heads. Effective switching between these heads is performed automatically by reason of the contact of one or the other of the heads with the magnetic recording medium. That is, the signal supplied to the head which is not in contact with the medium is, of course, not recorded. However, since the same signal is applied to the other head which is in contact with the medium, this signal is recorded in a respective track on the medium. If the heads are spaced apart by 180° and each head scans a track whose effective length is slightly greater than 180°, then the end portion of one track will have signals which are the same as those recorded in the beginning portion of the next adjacent track. Typically, the portion of the composite video signal which is recorded in this "overlapping" relation is the vertical blanking interval. During signal playback, a position pulse generator is provided to detect the position of each head relative to the recording medium. For example, a pulse is produced when one head first comes into contact with the medium to scan a track thereacross, and another pulse is produced when the other head first comes into contact with the medium to scan another, adjacent track. These pulses control the head switch-over. That is, when the first head-position pulse is produced, switching circuitry is actuated to couple the corresponding head to the signal receiving circuitry; and when the next head-position pulse is produced, the switching circuitry is actuated to disconnect the first head and to connect the other head to the receiving circuitry.

In the foregoing prior art proposal, a transient pulse, or noise, is produced when the switching circuitry is actuated. Ideally, this transient pulse will be produced at the same time during each vertical blanking interval (i.e., when the playback heads are switched over). However, in practice, because of tape shrinkage, different mechanical tolerances in different VTR systems, slightly different head speeds, and the like, the time of head switch-over, and thus the time that the transient pulse is produced, may vary. That is, the transient pulse may occur at the time of occurrence of an equalizing pulse, or between successive equalizing pulses, or at any other time during the vertical blanking interval. The resultant continuous video signal which is reproduced by the VTR system thus will have a transient pulse which occurs asynchronously at arbitrary locations. Although this may not be noticeable or detrimental in a home entertainment system, this arbitrarily occurring transient pulse is not acceptable for television broadcasting of the reproduced video signal.

OBJECTS OF THE INVENTION

Therefore, it is an object of the present invention to provide improved head switching control apparatus for use in a video signal processing system which overcomes the aforenoted problems attending prior art proposals.

Another object of the present invention is to provide an improved head switching control apparatus wherein individual ones of plural rotary transducer heads are connected, one at a time, and without overlap, to signal receiving circuitry in video signal processing apparatus.

A further object of this invention is to provide improved head switching control apparatus for use in a video signal processing system wherein a transient pulse, or noise, which is produced as a result of switching over from one to another of plural heads is synchronized to occur at the same relative time during predetermined intervals.

An additional object of this invention is to provide head switching control apparatus for use in a video signal reproducing system of the type having a pair of rotary magnetic playback heads wherein the output of one head is supplied to a demodulator and then the output of the other head is supplied to the demodulator, switching between these heads being timed to occur at the same relative time during each vertical blanking interval.

Various other objects, advantages and features of the present invention will become readily apparent from the ensuing detailed description, and the novel features will be particularly pointed out in the appended claims.

SUMMARY OF THE INVENTION

In accordance with the present invention, head switching control apparatus is provided for use in a video signal processing system of the type having plural rotary transducer heads for scanning successive tracks across a recording medium, each track having recorded therein a composite video signal comprised of video information, horizontal synchronizing signals and a vertical blanking interval. The head switching control apparatus functions to selectively connect individual transducer heads, one at a time, to video signal receiving circuitry. This head switching control apparatus is comprised of a position pulse generator for generating position pulses representing the relative positions of the transducer heads with respect to the recording medium; a bi-state circuit responsive to successive position pulses for switching between its first and second states as the transducer heads rotate into predetermined positions with respect to the recording medium; switching circuitry coupled to the transducer heads for electrically connecting individual heads to the video signal receiving circuitry; a synchronizing signal separator coupled to the video signal receiving circuitry for separating the synchronizing signals included in the vertical blanking interval from the composite video signal; and a switch pulse generator coupled to the synchronizing signal separator and to the bi-state circuit for generating switch pulses which are synchronized with the separated synchronizing pulses in response to the change of states of the bi-state circuit, these switch pulses being applied to actuate the switching circuitry so as to connect the transducer heads, one at a time, to the video signal receiving circuitry.

BRIEF DESCRIPTION OF THE DRAWINGS

The following detailed description, given by way of example, will best be understood in conjunction with the accompanying drawings in which:

FIGS. 2A-2J are waveform diagrams which are useful in understanding the operation of the block diagram shown in FIG. 1.

DETAILED DESCRIPTION OF A PREFERED EMBODIMENT

Figure 1:
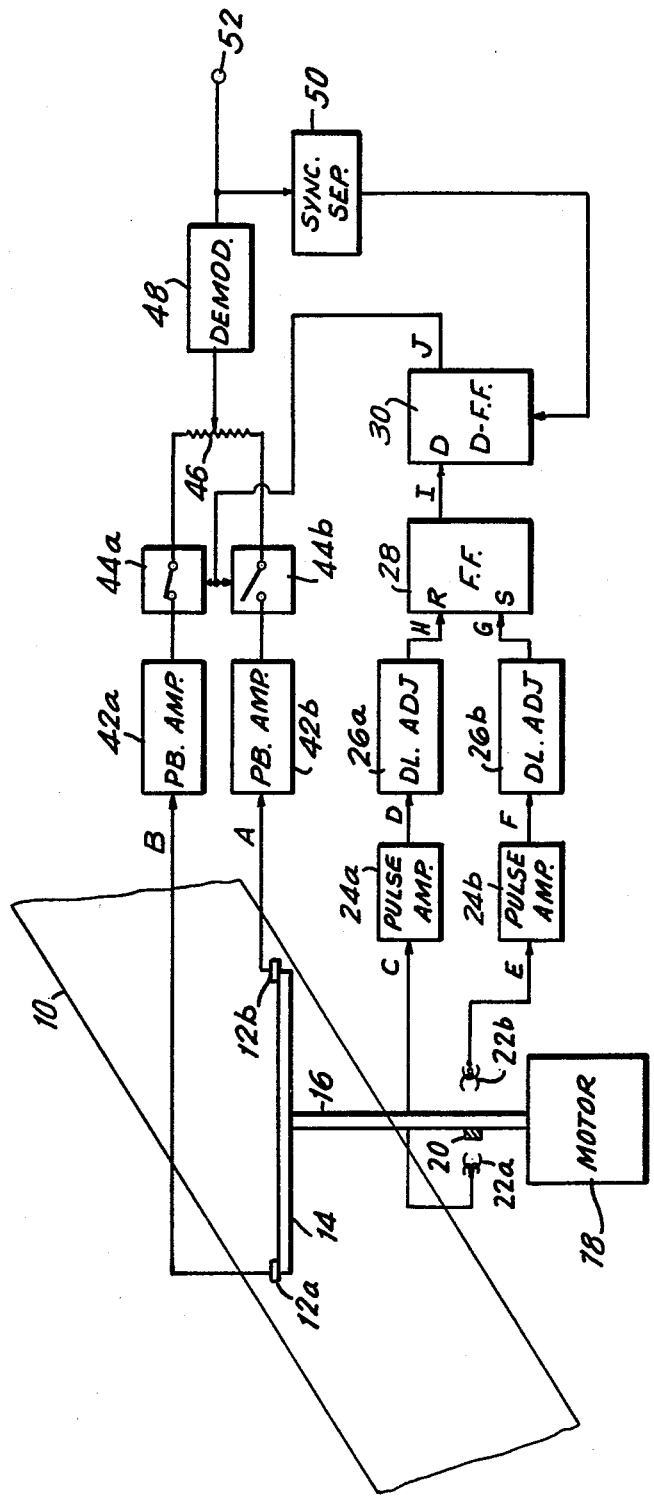
FIG. 1 is a block diagram of a preferred embodiment of the present invention.

Referring now to the drawings, and in particular to FIG. 1, there is illustrated a block diagram of a preferred embodiment of head switch control apparatus which can be used in a video recording system. Although this control apparatus can be used in the performance either of a recording operation or a reproducing operation, it will be described in the environment of a signal playback system. Furthermore, while the video recorder may comprise a VTR, a magnetic sheet recorder, a magnetic card recorder, or the like, in the interest of simplification, the illustrated embodiment will be described for use with a VTR. As will become apparent, the head switch control apparatus can be used with other types of recording systems, such as an optical recorder/playback device, or the like. In the further interest of simplification, the video recorder will be assumed to include two transducer heads; but it should be understood that, if desired, multiple heads can be used.

In the illustrated embodiment, a pair of transducer heads 12a, 12b, which may comprise magnetic recording/playback heads, are adapted to be rotated so as to scan parallel, successive tracks obliquely across the surface of a recording medium 10, such as magnetic recording tape. In an alternative embodiment, heads 12a and 12b may be capable of signal playback only. In either embodiment, these heads are mounted on a suitable support 14 which is coupled to a rotary shaft 16 driven by a motor 18. This motor is a servo-controlled motor such that the rotation of shaft 16, and thus heads 12a and 12b, is accurately controlled and is determined partly by the longitudinal movement of tape 10, as is known to those of ordinary skill in the video signal recording art. In order to sense the relative position of heads 12a and 12b with respect to recording medium 10, a magnet 20, such as a magnet formed of permanent magnetic material, is mounted or otherwise secured to shaft 16 so as to be rotated with the heads. Magnet 20 is particularly aligned such that it rotates past a predetermined point when head 12a first comes into contact with the recording medium so as to commence its scan of an oblique track. The position of magnet 20, and thus the position of head 12a, is sensed by a pickup coil 22a which is fixedly disposed at the aforenoted point. Similarly, another pickup coil 22b is disposed at a second location so as to sense the movement of magnet 20 therepast. This movement of the magnet is sensed when head 12b first comes into contact with recording medium 10 so as to commence its scan of an oblique track.

Pickup coils 22a and 22b function as a position pulse generator and are coupled to pulse amplifiers 24a and 24b, respectively. These amplifiers function to shape the signals produced by the respective pickup coils so as to form rectangular pulses of predetermined duration. Pulse amplifiers 24a and 24b are coupled to adjustable delay circuits 26a and 26b, respectively, these delay circuits functioning to impart a delay to the respective pulses applied thereto. The purpose of these delay circuits is explained hereinbelow.

The output of delay circuit 26a is coupled to the set input of a bi-state device 28, such as a bistable multivibrator, or flip-flop circuit. The output of delay circuit 26b is coupled to the reset input of this flip-flop circuit. As is understood by those of ordinary skill in the art, flip-flop circuit 28 is a bi-state device which is adapted to be set to a first state in response to a pulse applied to its set input, and to be reset to a second state in response to a pulse applied to its reset input. The particular state assumed by flip-flop circuit 28 is represented by a signal provided at its output. For the purpose of the present discussion, it will be assumed that a signal of relatively low level, hereinafter designated a binary 0, is produced at the output of flip-flop circuit 28 to represent that this flip-flop circuit is reset to its second state, and that this output signal switches to a relatively higher level, hereinafter designated as a binary 1, when the flip-flop circuit is set to its first state.

The output of flip-flop circuit 28 is coupled to a synchronizing, or re-timing circuit 30. This synchronizing circuit is of a type including a signal information input and a timing signal input. An output signal is produced thereby which corresponds to the received information signal in coincidence with a timing pulse applied to the timing input. In one embodiment thereof, synchronizing circuit 30 is a timing-pulse controlled flip-flop circuit, such as a D-type flip-flop, wherein the information signal input is represented as the "D" input and the timing pulse input is represented as the "T" input. The state of this D-type flip-flop circuit is determined by the logical sense of the signal applied to its D input, but in coincidence with the timing pulse which is applied to its T input. Thus, if a binary 1 is applied to the D input of flip-flop circuit 30, the output signal produced thereby as a representation of its state will be switched to a binary 1 when a timing pulse is applied to its T input. This state will be maintained until the information signal applied to its D input changes to a binary 0 and another timing pulse is applied to its T input.

The signal produced by synchronizing circuit 30, that is, the state of this flip-flop circuit, is used to control switching circuitry that is connected to respective transducer heads 12a and 12b so as to selectively couple these heads to further signal receiving circuitry. As will be explained below, when head 12a contacts recording medium 10 so as to reproduce the signals which have been recorded in a track, a switching circuit 44a is actuated to couple the reproduced signals from head 12a to the signal receiving circuitry. Similarly, when head 12b contacts recording medium 10 so as to reproduce the signals which have been recorded in a track, a switching circuit 44b is actuated to couple these reproduced signals to the signal receiving circuitry. Moreover, switching circuits 44a and 44b are controlled such that one is opened so as to disconnect its associated head from the signal receiving circuitry simultaneously with the closing of the other. To this effect, switching circuits 44a and 44b may comprise conventional solid-state switching devices having switch pulse control inputs coupled to the output of synchronizing circuit 30. In order to simplify the present discussion, these respective switching circuits are illustrated as mechanical switching devices.

Transducer 12a is coupled through an amplifier 42a, such as a playback amplifier, to switch 44a; and transducer 12b similarly is coupled through a playback amplifier 42b to switch 44b. A balancing circuit 46, illustrated as a potentiometer, is supplied with the signals produced by switches 44a and 44b and, after amplitude-balancing these signals, supplies them to signal receiving circuitry 48. It is appreciated that the illustrated signal reproducing system is adapted to reproduce video signals which have been recorded in successive tracks on medium 10. Typically, these video signals are modulated prior to recording, and the modulated video signals are recorded. Accordingly, in order to recover the original video signals, signal receiving circuitry 48 preferably includes a demodulator which is adapted to demodulate the reproduced, modulated video signals. In one example, the video signals are recorded as frequency-modulated signals. Accordingly, demodulator 48 would comprise a frequency demodulator. The output of demodulator 48 is coupled to a video signal output 52 and, additionally, to a synchronizing signal separator circuit 50. This latter circuit is known to those of ordinary skill in the art and is adapted to separate the various video synchronizing signals included in the composite video signal derived from demodulator 48. These synchronizing signals, which include the horizontal synchronizing pulses and the various synchronizing signals included in the vertical blanking interval, are applied to the timing pulse input of synchronizing circuit 30.

The operation of the head switch control apparatus illustrated in FIG. 1 now will be described with reference to FIGS. 2A–2J. The video signals which are recorded on recording medium 10 are composite video signals containing video information, horizontal synchronizing signals and various other synchronizing signals included in the vertical blanking interval. The video information may be color television signal information, such as an NTSC color video signal. Typically, the vertical blanking interval separates successive fields of signal information and is provided with a plurality of equalizing pulses followed by a plurality of vertical synchronizing pulses followed by another set of equalizing pulses and then a plurality of horizontal line intervals from which video signal information is omitted. As mentioned above, a field of video signals is recorded in each track on medium 10. If desired, such tracks may be recorded either by heads 12a and 12b, which will be constructed as record/playback heads, or by other video signal recording apparatus. Furthermore, in the intended application for use in television signal broadcasting, the composite video signals are recorded as modulated signals, such as frequency-modulated video signals, in the respective tracks. Furthermore, the signal recording format preferably is such that the vertical blanking interval is recorded in the beginning portion of a track, followed by the field of video information, and the next vertical blanking interval is recorded in the end portion of that track. Also, the recording heads generally are disposed such that one head reaches the end portion of a track just as the other head first contacts the recording medium, thereby resulting in an overlap of signals recorded on adjacent tracks. That is, the vertical blanking interval recorded in the end portion of one track is the same as the vertical blanking interval recorded in the beginning portion of the next adjacent track.

In a signal reproducing operation, let it be assumed that head 12a is rotated into position to reproduce the video signals recorded in a track just as head 12b departs from a track. Hence, the video signals reproduced by head 12a appear as shown in FIG. 2B. Slope 62 shown in FIG. 2B represents the movement of head 12a into contact with recording medium 10. At the same time, the signals reproduced by head 12b appear as shown in FIG. 2A. Slope 64, which is shown in FIG. 2A, represents the departure of head 12b from recording medium 10. As is appreciated, head 12b does not reproduce any useful signal information once it departs from the recording medium. A comparison of FIGS. 2A and 2B indicates the overlapping portion of the vertical blanking intervals recorded on adjacent tracks. These overlapping portions are reproduced simultaneously by heads 12a and 12b. However, the head switch control apparatus shown in FIG. 1 prevents both reproduced signals from being applied simultaneously to demodulator 48.

As motor 18 drives shaft 16 to rotate heads 12a and 12b, magnet 20, included in the position pulse generator, likewise is rotated. When head 12a arrives at the beginning portion of a track, pickup coil 22a senses the corresponding position of magnet 20 so as to produce the pulse shown in FIG. 2C. Since head 12a rotates into contact with recording medium 10 at the vertical blanking interval of the recorded field of video signals, the pulse (FIG. 2C) produced by coil 22a is generated at approximately the start of this vertical blanking interval. Pulse amplifier 24a shapes the pickup-coil generated pulse as shown in FIG. 2D, and this shaped pulse is delayed by delay circuit 26a so as to insure that the delayed pulse (FIG. 2H) will occur well within the vertical blanking interval and, preferably, during the first set of equalizing pulses. The delayed pulse of FIG. 2H is applied to the reset input of flip-flop circuit 28 so as to reset this flip-flop circuit to its second state, as represented by the output signal shown in FIG. 2I.

As motor 18 continues to drive shaft 16, head 12a reproduces the remaining field recorded in the track which is scanned thereby, as represented by FIG. 2B. As this head scans the end portion of the track, head 12b rotates into position to commence scanning the next adjacent track, as shown in FIG. 2A. Accordingly, head 12b commences to reproduce the signals recorded in the adjacent track, as indicated by the slope 66 in FIG. 2A. As was discussed previously, the vertical blanking interval reproduced by head 12b in the track scanned thereby is the same as the vertical blanking interval reproduced by the head 12a recorded in the preceding track. This period of overlap ends when head 12a departs from recording medium 10, as represented by slope 68 in FIG. 2B.

Coincident with the scanning of the track by head 12b, magnet 20 rotates past pickup coil 22b which detects this magnet to produce the position pulse shown in FIG. 2E. This pulse is shaped and amplified in amplifier 24b (FIG. 2F) and is delayed by delay circuit 26b so as to produce the delayed position pulse shown in FIG. 2G. The purpose of delay circuit 26b is similar to that of delay circuit 26a, that is, to insure that the position pulse derived from pickup coil 22b occurs during the vertical blanking interval reproduced by head 12b and, preferably, during the first set of equalizing pulses. The position pulse shown in FIG. 2G is applied to the set input of flip-flop circuit 28 so as to set this flip-flop circuit to its first state, resulting in the output signal shown in FIG. 2I.

It may be thought that this signal (FIG. 2I) produced by flip-flop circuit 28 can be used to control switching circuits 44a and 44b. That is, the negative transition in this signal could be used to close switching circuit 44a and concurrently open switching circuit 44b. Similarly, the positive transition in this signal could be used to open switching circuit 44a and concurrently close switching circuit 44b. However, this is not desirable for the reasons now explained. A transient pulse, or noise, is produced when the respective switching circuits are actuated or deactuated (i.e., closed or opened). These transients are superimposed onto the video signals which then are reproduced by heads 12a and 12b and supplied to demodulator 48. Because of tape shrinkage, or change in the rotary speed of the transducer heads or other parameters, or in the event that the signals recorded on medium 10 are recorded by a different recording system than the system which is used to reproduce these signals, the times of occurrence of the negative and positive transitions shown in FIG. 2I are not necessarily fixed with respect to the reproduced vertical blanking interval. That is, the foregoing factors may result in the actuation and deactuation of switching circuits 44a and 44b at some arbitrary time during the vertical blanking intervals. This has the effect of superimposing transient noise into correspondingly arbitrary locations in the vertical blanking intervals. While such transient noise may be tolerated in, for example, home video playback systems, it is not acceptable in a reproduced video signal that is to be processed for, for example, a television broadcast. In addition, in a practical system, the demodulated video signal produced by demodulator 48 may be applied to a time-base correcting circuit which functions to correct time-base errors which may be caused by tape shrinkage, tape stretching, changes in tape speed, or any of the other above-mentioned factors. Such time-base error correction depends upon sensing the horizontal synchronizing pulses as well as the equalizing pulses and vertical synchronizing pulses included in the vertical blanking interval of the demodulated video signal. If transient noise occurs at an arbitrary location between, for example, successive horizontal synchronizing pulses or between successive equalizing pulses, the time-base correcting circuit may erroneously interpret such transient noise as a synchronizing pulse. This interpretation by the time-base correcting circuit would inhibit proper time-base correction.

This problem is overcome by the head switching control apparatus shown in FIG. 1. The signal produced by flip-flop circuit 28 is applied to synchronizing circuit 30 which is synchronized with the synchronizing pulses separated from the demodulated composite video signal by synchronizing signal separator circuit 50. More particularly, and with the assumption that synchronizing circuit 30 is, in one embodiment, a timing-pulse controlled flip-flop circuit, such as a D-type flip-flop circuit, flip-flop circuit 30 changes its state to correspond to the state of flip-flop circuit 28, as represented by the signal (FIG. 2I) applied thereto by flip-flop circuit 28, only when a separated synchronizing pulse is applied to its T input. Thus, if flip-flop circuit 28 changes its state at some arbitrary time between, for example, the second and third equalizing pulses included in the first set of equalizing pulses provided in the vertical blanking interval reproduced by head 12a, flip-flop circuit 30 does not change its state until the third equalizing pulse (FIG. 2B) is applied to its T input by synchronizing signal separator circuit 50. At that time, flip-flop circuit 30 changes its state, as shown in FIG. 2J. Similarly, when flip-flop circuit 28 is set to its first state by the delayed position pulse shown in FIG. 2G, flip-flop circuit 30 does not follow this change of state until the third equalizing pulse included in the vertical blanking interval reproduced by head 12b is applied to its T input, as shown in FIG. 2J.

Therefore, it is seen from FIG. 2J that switching pulses produced by flip-flop circuit 30 are synchronized with the equalizing pulses which are separated from the reproduced composite video signal. Hence, switches 44a and 44b are actuated and deactuated at the same relative time, that is, substantially in coincidence with an equalizing pulse, regardless of when flip-flop circuit 28 changes its state. That is, although flip-flop circuit 28 may change its state at any arbitrary time between successive equalizing pulses, flip-flop circuit 30 is synchronized so as to change its state only in synchronism with an equalizing pulse. Consequently, transient noise which is produced by the actuation and deactuation of the switching circuits 44a and 44b is superimposed onto the reproduced composite video signal in coincidence with an equalizing pulse included in the vertical blanking interval. This avoids the problem of misinterpreting such transient noise by a time-base correcting circuit. Hence, time-base errors can be readily corrected. Also, since a time-base error correcting operation essentially reshapes the various synchronizing pulses, these reshaped pulses will be free of the transient noise which is superimposed onto the equalizing pulse. The resultant composite video signal is satisfactory for television broadcasting.

While the present invention has been particularly shown and described with reference to a preferred embodiment thereof, it will be readily apparent to one of ordinary skill in the art that various changes and modifications in form and details can be made. For example, synchronizing circuit 30 may be comprised of a gated flip-flop circuit which functions to synchronize the output of flip-flop circuit 28 (FIG. 2I) with a separated synchronizing pulse. As another example, although the adjustability of delay circuits, 26a and 26b is desirable so as to account for a wide range of tape shrinkage or tape stretching or tape speed changes or other parameters which may affect the relative time of occurrence of a position pulse, the delay imparted by these delay circuits may be fixed, but may be of a duration greater than that illustrated by FIGS. 2G and 2H. As yet another example, the position pulse generator comprised of magnet 20 and pickup coils 22a and 22b may be replaced by other equivalent position sensing transducers, such as an optical position sensor, or the like.

It is intended that the appended claims be interpreted as including the foregoing as well as all other changes and modifications which do not depart from the spirit and scope of the present invention.

What is claimed is:

1. In video signal processing apparatus of the type comprising plural rotary record and/or playback transducers heads for scanning successive tracks across a recording medium, each track having recorded therein a composite video signal comprised of video information, horizontal synchronizing signals and a vertical blanking interval containing equalizing pulses, vertical synchronizing pulses and horizontal synchronizing pulses, head switching control apparatus for selectively connecting individual transducer heads, one at a time, to video signal receiving means, comprising: position pulse generating means for generating position pulses representing the relative positions of said transducer heads with respect to said recording medium; bi-state means having first and second states and responsive to successive position pulses applied thereto for switching between said first and second states as said transducer heads rotate into predetermined position with respect to said recording medium; video signal receiving means; switch means coupled to said transducer heads for electrically connecting individual ones of said heads to said video signal receiving means; synchronizing signal separator means coupled to said video signal receiving means for separating from said video signal the equalizing pulses, vertical synchronizing pulses and horizontal synchronizing pulses included in said vertical blanking interval; switch pulse generating means coupled to said synchronizing signal separator means to receive at least the equalizing pulses separated from said video signal and responsive to said first and second states of said bi-state means for generating a switch pulse whose state is determined by the state of said bi-state means and which switch pulse is synchronized to switch to said determined state by the first equalizing pulse which is received by said switch pulse generating means after said bi-state means has been swtiched to a respective one of said first and second states; and means for applying said switch pulses to said switch means for selectively actuating said switch means so as to connect said transducer heads one at a time to said video signal receiving means.

2. The apparatus of claim 1 wherein said plural rotary transducer heads comprise a pair of heads spaced 180° apart from each other and disposed such that one head scans the beginning portion of one track while the other head scans the end portion of an adjacent track; and wherein each track has one video field recorded therein.

3. The apparatus of claim 2 wherein said bi-state means is a bistable multivibrator responsive only to said position pulses for changing the state thereof; and said switch pulse generating means is a timing-pulse controlled flip-flop circuit having an information signal input coupled to receive a signal representing the state of said bistable multivibrator and a timing pulse input coupled to receive said separated pulses included in said vertical blanking interval for changing the state thereof in correspondence with the state of said bistable multivibrator when a separated pulse is received.

4. The apparatus of claim 2 wherein said signal processing apparatus comprises video signal playback means and wherein the composite video signal is recorded in modulated form; and said video signal receiving means includes demodulating means for receiving and demodulating the video signal reproduced by said transducer heads.

5. The apparatus of claim 4 further comprising adjustable delay means for imparting an adjustable delay to the generated position pulses so as to insure that said position pulses are applied to said bi-state means during said vertical blanking interval.

6. In video signal reproducing apparatus of the type having a pair of rotary magnetic playback heads for reproducing a modulated composite video signal recorded in parallel tracks on a magnetic recording medium, said composite video signal being comprised of video information, horizontal synchronizing pulses and vertical blanking intervals containing at least equalizing pulses and vertical synchronizing pulses, each track having a video field recorded therein and said heads being disposed to scan simultaneously portions of adjacent tracks, means for selectively connecting each head, one at a time and in succession, to video signal demodulating means comprising, in combination: position pulse generating means for generating a first position pulse when one of said heads rotates into predetermined position with respect to said recording medium and a second position pulse when the other of said heads rotates into said predetermined position; bi-state means responsive to said first and second position pulses for switching between first and second conditions and for producing a first signal representing a first condition of said bi-state means and for producing a second signal representing a second condition of said bi-state means; demodulator means for demodulating the compositive video signal reproduced by said transducer heads; switch means coupled to said transducer heads and being actuable to selectively apply the signals reproduced by said heads to said demodulator means, said switch means, when actuated, superimposing a transient signal onto the signals applied to said demodulator means; synchronizing signal separator means coupled to said demodulator means for deriving the equalizing and vertical synchronizing pulses included in the vertical blanking interval of the composite video signals reproduced by said transducer heads; synchronizing means coupled to said bi-state means and to said synchronizing signal separator means to use said equalizing pulses as timing pulses to synchronize said first and second signals to occur in time coincidence with the occurrence of an equalizing pulse; and means for applying the synchronized first and second signals to said switch means so as to actuate said switch means to apply the signals reproduced by one and then the other of said heads to said demodulator means such that said demodulator means is supplied with a continuous, substantially non-overlapping video signal and said transient signal is superimposed onto said equalizing pulse.

* * * * *